United States Patent
Ragnunath et al.

(10) Patent No.: US 7,680,643 B2
(45) Date of Patent: Mar. 16, 2010

(54) METHOD FOR CARRYING MULTIPLE SUSPENDED RUNTIME IMAGES

(75) Inventors: Mandayam Thondanur Ragnunath, Fishkill, NY (US); Chandrasekhar Narayanaswami, Wilton, CT (US)

(73) Assignee: International Business Machines Corporation, Armonk, NY (US)

(*) Notice: Subject to any disclaimer, the term of this patent is extended or adjusted under 35 U.S.C. 154(b) by 480 days.

(21) Appl. No.: 11/281,795

(22) Filed: Nov. 17, 2005

(65) Prior Publication Data

US 2007/0113228 A1    May 17, 2007

(51) Int. Cl.
G06F 9/44 (2006.01)
G06F 13/10 (2006.01)
G06F 13/12 (2006.01)

(52) U.S. Cl. .................. 703/20; 718/1; 703/21
(58) Field of Classification Search ........... 703/20, 703/21; 718/1
See application file for complete search history.

(56) References Cited

U.S. PATENT DOCUMENTS 6,795,966 B1* 9/2004 Lim et al. ............ 718/1
7,032,053 B2   4/2006 Himmel
2004/0054678 A1* 3/2004 Okamoto et al. ...... 707/100
2006/0155735 A1* 7/2006 Traut et al. ........... 707/101

OTHER PUBLICATIONS

Ramon Caceres, Casey Carter, Chandra Narayanaswami, and Mandayam Raghunath, "Reincarnating PCs with Portable SoulPads," USENIX Association, MobiSys '05: The Third International Conference on Mobile Systems, Applications, and Services, pp. 65-78.
George Schwenzfeger, "Setting up a Dual Boot with Win XP and Linux using the GRUB Loader," DevHood, 2002.
Blane Warrene, "Portable Linux Virtual Machines," SitePoint.com.

* cited by examiner

*Primary Examiner*—Kamini Shah
*Assistant Examiner*—Saif Alhija
(74) *Attorney, Agent, or Firm*—Michael J. Buchenhorner; Vazken Alexanian

(57) ABSTRACT

A portable device is connected to a host system that operates according to a first industry standard architecture (e.g., a personal computer built according to the IBM Personal Computer standard). The user initiates a session in the host system using the software and data in the portable device. The user suspends the state of the session, the state is stored in the portable device, and the user disconnects the portable device from the host. The user later connects the portable device to a second host that operates according to a second industry standard architecture (e.g., Apple Macintosh™ computer). The second host boots an autoconfiguring host operating system stored in the portable device and starts a virtual machine layer also stored in the portable device. The user then resumes operation of the suspended virtual machine layer session.

6 Claims, 3 Drawing Sheets

METHOD FOR CARRYING MULTIPLE SUSPENDED RUNTIME IMAGES

CROSS-REFERENCE TO RELATED APPLICATIONS

This application relates to improvements on the invention of U.S. patent application Ser. No. 10/795,153, which is hereby incorporated by reference.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information processing systems and more particularly relates to the field of portable personal electronic devices.

BACKGROUND OF THE INVENTION

Information storage capacities (e.g., disk capacities) are increasing rapidly and it is becoming possible to add large capacity disk storage to several portable devices such as the iPod™ music player or any of several personal digital assistant (PDA) form factor devices. The power consumption of disk drives has also been reduced to the point that the disks may be powered by batteries that are part of the portable devices themselves. For devices where energy is a more critical resource, it is also possible to have disk storage present in a piggy back manner, where the disk is accessible only when the portable device is connected to another device that supplies power to the portable device, for example through a USB (universal serial bus) connection. This trend has made it possible for a user to store, in a portable storage device (PSD), a processing session begun in a first host computer and to resume the session in a second host computer. However, when the first and second host computers operate according to different industry standard architectures (e.g., IBM personal computer and Apple MacIntosh™, a user may encounter difficulty or find it impossible to resume a suspended session in the second host computer. Therefore, there is a need for a solution to this shortcoming.

SUMMARY OF THE INVENTION

According to the embodiment of the invention, a portable device carries multiple software stacks, one for each of two or more types of industry standard architectures so that the portable device can be coupled to various host computer systems using various incompatible architectures and yet each host system can boot from the portable device. In one embodiment of the invention, the portable device is connected to a first host system that operates according to a first industry standard architecture (e.g., a personal computer built according to the IBM Personal Computer Standard); the user initiates a session in the host system using the software and data in the portable device; the user suspends the state of the session, the state is stored in the portable device, and the user disconnects the portable device from the first host. The user later connects the portable device to a second host that operates according to a second industry standard architecture (e.g., Apple Macintosh™). The second host boots an autoconfiguring host operating system stored in the portable device and starts a virtual machine layer also stored in the portable device. The user then resumes operation of the suspended virtual machine layer session in the second host computer.

DETAILED DESCRIPTION

Figure 1A:
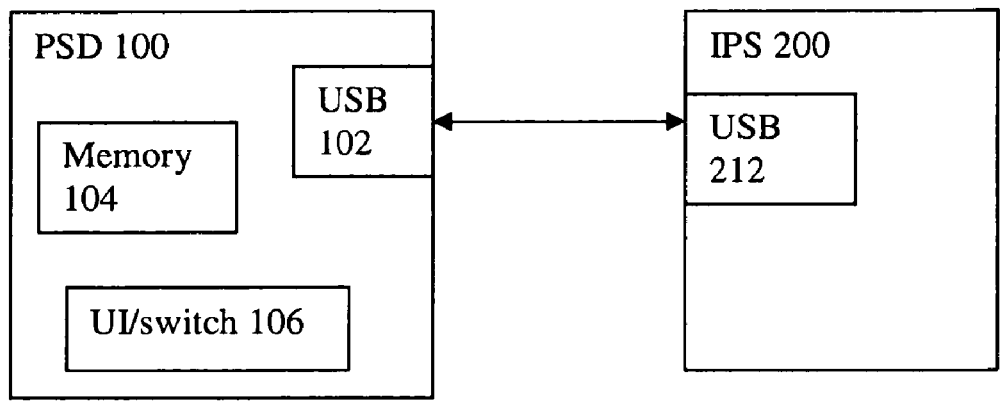
FIGS. 1A and 1B are high level block diagrams showing a portable device for coupling to a first and second host processing systems operating under different industry standards according to an embodiment of the invention.

Referring to FIG. 1A, there is shown a portable storage device (hereafter, "PSD" or "portable device") 100 connected to a first host processing system 200. A PSD is any electronic device that includes sufficient storage to operate as discussed herein and is not necessarily a device whose principal function is storage. The PSD 100 comprises a USB (universal serial bus) port 102 for coupling to a USB port 212 in the host system 200 and a memory 104 for storing (among other things) a portable computing environment. The memory 104 is preferably a persistent storage device such as a hard disk drive for storing a portable computing environment but can also be semiconductor memory such as a Flash EPROM or an equivalent. The PSD 100 may also comprise a user interface 106 with a switch so that a user can select an industry standard architecture suitable for a host system to which the user plans to connect the PSD 100. The memory also stores software to suspend and resume the state of a computing session, and to boot host computers from a wired connection interface such as a USB or Firewire interface 102. In FIG. 1A, the PSD 100 is coupled to a host system 200 that operates according to a first industry standard architecture, such a personal computer built according to the IBM Personal Computer Standard. The user boots the host system 200 from software (or firmware) in the PSD 100 appropriate for the first industry standard architecture. The user then initiates a session in the host system 200, works on the host system, perhaps then suspends the computing state, and disconnects the PSD 100 from the host system 200.

Figure 1B:
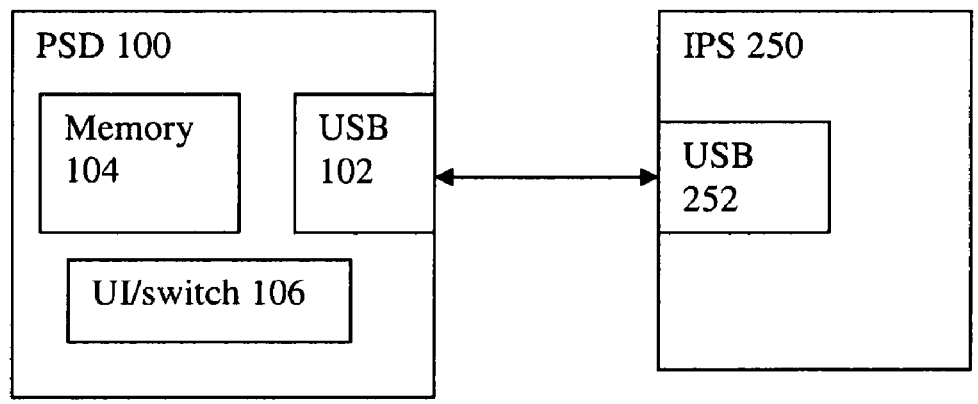

Referring to FIG. 1B, the user travels to a different environment and connects the PSD 100 to a second host system 250 via a USB interface 252. The second host system 250 operates according to a second industry standard architecture such as that of the Apple Macintosh™. The second host 250 boots from software in the PSD 100 suitable for the second industry standard architecture.

The attached PSD 100 has a small form factor such as the size of a deck of cards and is expected to become even smaller as technology advances. The PSD 100 works with the already deployed and pervasive collection of personal computers, attaching to them over a fast local connection. Effectively, everything from the standard host processing system, such as its central processor unit, memory, display, network, possibly except its hard disk drive will be exploited. To be successful, the connection process should be quick and the portable device should be less onerous to maintain than a separate computer system or systems. The ideal solution should be very easy to use and should be able to resume computation at the same state where it was suspended.

Figure 2:
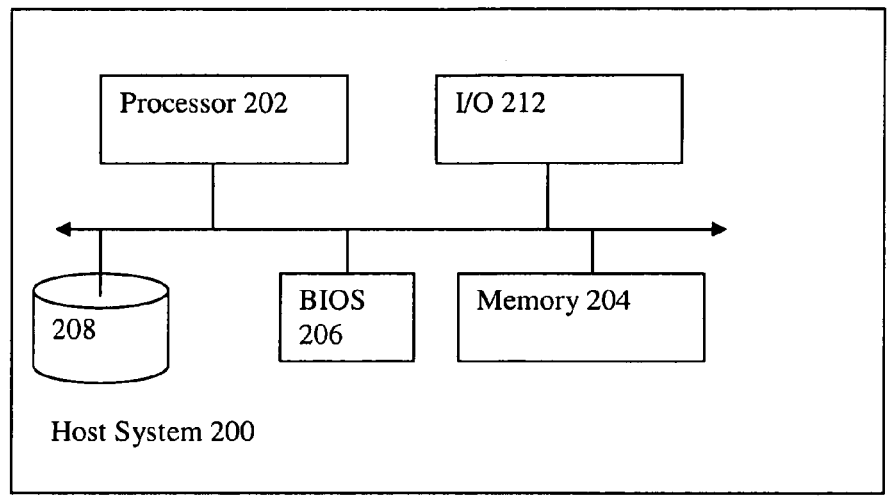
FIG. 2 is a block diagram showing a host information processing system according to the embodiments shown in FIGS. 1A and 1B.

Referring to FIG. 2, we show a block diagram of a host information processing system 200 according to the embodiments shown in FIG. 1A. In this embodiment, the host system 200 is a personal computer that operates according to a first industry standard architecture (in this case, the IBM PC standard). Therefore, the system 200 comprises a basic input/output system (BIOS) 206 according to the IBM Personal Computer standard. The host system 200 also comprises a processor 202, a memory 204 a hard disk drive 208, and the I/O interface 212. The second host system 250 includes similar components but operates under the Apple Macintosh architecture standard.

Figure 3:
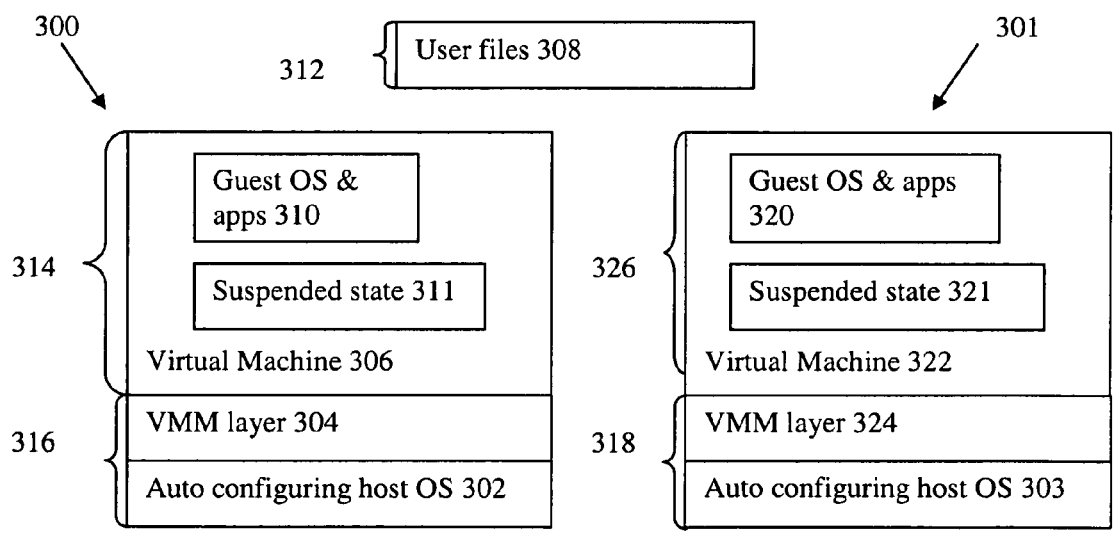
FIG. 3 is a block diagram showing software stack according to an embodiment of the invention

Referring to FIG. 3, we show a simplified version of some of the contents of the memory 104 of the PSD 100. According to an embodiment of the invention, instead of carrying a single multi-layer stack, according to embodiments of the invention the PSD 100 carries multiple multi-layer stacks 300 and 301, one for each type of host architecture and a suspended state for each host system. The first software stack 300 consists of three partition layers 312, 314, and 316. Layer 312 includes the user files 308 and is common to both architecture types. Layer 314 comprises the guest OS, applications, and executables 310 and a suspended runtime state 311 from prior session. Layer 316 comprises an auto configuring host OS 302 and a virtual machine monitoring (VMM) layer 304. When the software stack 300 is stored in portable device 100, it becomes able to carry a suspended computing state and to resume that state on any other host information processing system that is found in the environment, as described in U.S. patent application Ser. No. 10/795,153. Stack 301 is adapted to operate under a different industry standard architecture. In this example, the stack 300 operates according to the IBM PC standard and stack 301 according to the Macintosh standard. However, the invention can be used with any two or more incompatible industry standard architectures. Therefore, the PSD 100 can carry any number of different industry standard stacks that fit in its storage. The second stack 301 includes the partition 312 and a second partition 326 that contains: a virtual machine 322 comprising a guest operating system, applications executables 320 and a suspended state 321. The stack 301 also includes a third layer 318 that includes an autoconfiguring host OS 303 for the Macintosh standard and a VMM layer 324.

Embodiments of the invention enable a usage model where a single device 100 carries software essential for multiple hardware architectures and enables a user to access his own computing state on those different architectures. This structure enables a usage model where a single device carries "souls" for multiple hardware architectures and enables a user to access his or her own computing state on different architectures.

When the portable device 100 containing the PSD software stack 300 is connected to a PC (e.g., 200), the PC boots from this portable device 100, starts up the host OS and VMM layers corresponding to the PC architecture and resumes a suspended guest OS state that accesses the partition corresponding to the user files when necessary. When the portable device 100 connects to a Macintosh computer, the host OS and VMM partition corresponding to the Macintosh computer are used to boot the Macintosh computer using the stack 301 and resume a suspended Macintosh session which also accesses the user files from the same shared partition where the user files reside. Because the user file partition 312 is shared between architectures, a user can work on a file on a PC and save it back to the user partition 312 and then may resume work on a Mac and edit the same file there using a Macintosh application that understands the same file format. One problem that needs to be overcome to achieve this solution is to make sure that the host machine boots from the correct disk partition from the portable device 100. Typically, when a host system is trying to boot from external media, it goes to a specific place on the disk to fetch its boot loader or other initial code to execute. We need to make sure that the machine that is trying to boot gets the code appropriate for its architecture. For example, PCs go to the Master Boot Record of a disk to initiate the booting sequence and unless the master boot record has code suitable for the PC architecture, the PC cannot boot. There may be similar constraints on other architectures as far as booting is concerned. To solve this problem, we can add a switch 106 on the portable device 100 carrying the software stack 300, that selects the architecture before we attach it to a machine and try to boot it. Based on this switch 106, the PSD device 100 presents the appropriate host OS to the host machine that is seeking to boot. If the PSD 100 has its own native function and user interface it will be able to access files in partition 312 without having to connect to a host computer. See U.S. patent application YOR920050266US1, which is hereby incorporated by reference.

Instead of a physical hardware switch, if the mobile device that performs the PSD's native function, has its own base functionality and therefore has user interface controls, the hardware switch 106 can simply be a selection from a menu using the UI controls.

In this embodiment, we assume that the user was editing a file from the shared user partition on one architecture, suspends that session, and resumes on a different architecture. If the edit session is suspended without saving the file, the partial edits generally will not be available when resuming on a different architecture. If the "auto save" function is turned on, then the partial edits may be periodically saved back to the user partition. In this case, the partial edits up until the last auto save point can be made available on the second architecture if the editor on the second architecture can process the partial edit file. Any state that was part of the editor process on the first architecture will not be available.

In the embodiments discussed above, the PSD 100 carries images for two different architectures, but the model readily extends to more than two architectures. In the longer term, if storage density were to increase substantially, one could carry the PSD stack on a SD (secure digital) card with a couple of switch settings and insert the card into a PDA (personal digital assistant) or other portable device and resume one's appropriate suspended computing state on that device. In other words, one of the host systems 200 or 250 could be a small form-factor device such as a PDA.

Figure 4:
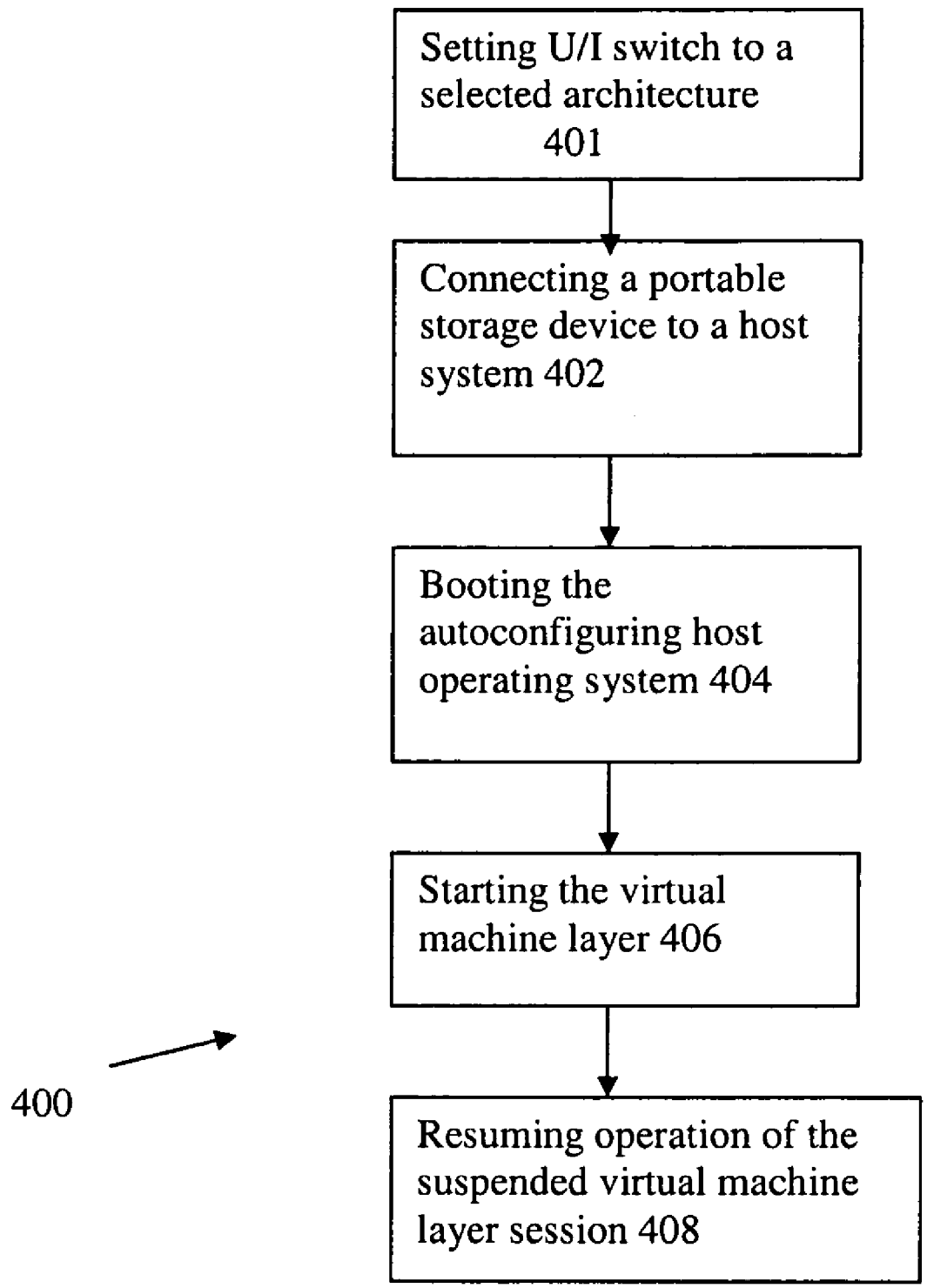
FIG. 4 is a flow chart of a method according to an embodiment of the invention.

Referring to FIG. 4, a flowchart illustrates a computer-implemented method 400 according to another embodiment of the invention. In step 401 the user of the PSD 100 sets the switch 106 to a selected industry standard architecture. In step 402 a portable storage 100 device is connected to a host system 200. Step 404 boots the autoconfiguring host operating system. Step 406 starts the virtual machine layer. Step 408 resumes operation of the suspended virtual machine layer session.

Therefore, while there has been described what are presently considered to be the preferred embodiments, it will be understood by those skilled in the art that other modifications can be made within the spirit of the invention.

We claim:

1. A method implemented by a secure digital card (SDC), the method comprising:
    activating a hardware switch device on the SDC to indicate a selection of a first industry standard architecture from which to boot a first host computer, wherein the hardware switch device is part of the secure digital card and comprises a setting indicating a selection of an appropriate host operating system;
    connecting the portable device to the first host computer operating under the first industry standard architecture;
    providing from the SDC a first autoconfiguring host operating system to the first host computer according to the switch device selection, wherein the first autoconfiguring host operating system is located within a first selectable software stack stored in the SDC, the first selectable software stack comprising a first virtual machine layer, a first virtual machine monitoring layer, and the first autoconfiguring host operating system, all according to the first industry standard architecture;
    booting the first host computer from the first autoconfiguring host operating system stored in the SDC;
    starting the first virtual machine layer on the first host computer;
    commencing a session on the first host computer, comprising accessing user files stored in a user file partition of the SDC, the user file partition shared between multiple host architectures;
    suspending the session and storing a state of the session in the first virtual machine monitoring layer;
    disconnecting the SDC from the first host computer;
    setting the switch device to select a second industry standard architecture for connecting to a second host computer;
    connecting to the second host computer operating under the second industry standard architecture, wherein the second industry standard architecture is not compatible with the first industry standard architecture;
    presenting a second autoconfiguring host operating system to the second host computer according to the switch device selection, wherein the second autoconfiguring host operating system is located within a second selectable software stack in the SDC, the second selectable software stack comprising a second virtual machine layer, a second virtual machine monitoring layer, and the second autoconfiguring host operating system, all according to the second industry standard architecture;
    booting the second host computer from the second autoconfiguring host operating system stored in the SDC, wherein the second host computer comprises an architecture that is different from that of the first host computer; and
    starting the second virtual machine monitoring layer on the second host computer.

2. The method of claim 1 wherein
    the connecting step comprises inserting the secure digital card into a slot on a host computer; and
    the host computer is a handheld device.

3. A secure digital card programmed to execute instructions for causing a computer to perform a method comprising steps of:
    activating a hardware switch on the secure digital card to indicate a selection of an appropriate host operating system from which to boot a host computer; wherein the secure digital card comprises:
    a first selectable software stack comprising a first virtual machine layer, a first virtual machine monitoring layer, and a first autoconfiguring host operating system, all according to the first industry standard architecture; and
    a second selectable software stack comprising a second virtual machine layer, a second virtual machine layer, and a second autoconfiguring host operating system, all according to a second industry standard architecture, wherein the second industry standard architecture is not compatible with the first industry standard architecture;
    connecting the secure digital card to a first host computer operating under the first industry standard architecture;
    providing from the secure digital card to the first host computer a first autoconfiguring host operating system according to the switch device selection;
    booting the first host computer from the first autoconfiguring host operating system stored in the secure digital card;
    starting the first virtual machine layer on the first host computer;
    commencing a session on the first host computer, comprising accessing user files stored in a user file partition of the secure digital card, said user file partition shared between multiple host architectures;
    suspending the session and storing a state of the session in the first virtual machine monitoring layer; and
    disconnecting the secure digital card from the first host computer.

4. The secure digital card of claim 3 wherein the method further comprises:
    setting the switch device to a second industry standard architecture for connecting to a second host computer;
    connecting to the second host computer operating under the second industry standard architecture;
    presenting the second autoconfiguring host operating system to the second host computer according to the switch device selection;
    booting the second host computer from the second autoconfiguring host operating system stored in the secure digital card, wherein the second host computer comprises an architecture that is different from that of the first host computer; and
    starting the second virtual machine monitoring layer on the second host computer.

5. The secure digital card of claim 3 wherein the method further comprises inserting the secure digital card into a slot on the first host computer.

6. The secure digital card of claim 3 wherein the step of connecting to the first computer comprises connecting to a device selected from a group consisting of: a personal digital assistant, a laptop, a handheld device, and a server.

* * * * *